United States Patent
Kraft et al.

(10) Patent No.: US 6,633,867 B1
(45) Date of Patent: Oct. 14, 2003

(54) SYSTEM AND METHOD FOR PROVIDING A SESSION QUERY WITHIN THE CONTEXT OF A DYNAMIC SEARCH RESULT SET

(75) Inventors: Reiner Kraft, Gilroy, CA (US); Michael Lawrence Emens, San Jose, CA (US); Peter Chi-Shing Yim, San Francisco, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/543,383

(22) Filed: Apr. 5, 2000

(51) Int. Cl.[7] .................................................. G06F 7/00
(52) U.S. Cl. .............................. 707/3; 707/5; 707/10; 705/26; 705/27
(58) Field of Search ................ 707/3, 10, 5; 705/26–27

(56) References Cited

U.S. PATENT DOCUMENTS

| | | | |
|---|---|---|---|
| 5,555,403 A | 9/1996 | Cambot et al. | |
| 5,832,221 A | 11/1998 | Jones | 375/200.36 |
| 5,832,481 A | 11/1998 | Sheffield | 70/74 |
| 5,842,009 A | 11/1998 | Borovoy et al. | |
| 5,893,125 A | 4/1999 | Shostak | 707/511 |
| 5,920,854 A | 7/1999 | Kirsch et al. | 707/3 |
| 5,950,190 A | 9/1999 | Yeager et al. | 707/6 |
| 6,119,101 A * | 9/2000 | Peckover | 705/26 |
| 6,366,923 B1 * | 4/2002 | Lenk et al. | 707/104 |

OTHER PUBLICATIONS

Resource Discovery Unit, Survey of Z39.50 to Web Gateways, Version 3.0, Sep. 04, 1996, http://archive.dstc.edu.au/RDU/reports/zreviews/z3950–gateway–survey.html.*

Biblio–tech.com, Z39.50 Extended and Explain Services, http://www.biblio–tech.com/html/z39_50_extended.html.*

* cited by examiner

*Primary Examiner*—Kim Vu
*Assistant Examiner*—Hung Pham
(74) *Attorney, Agent, or Firm*—Samuel A. Kassatly

(57) ABSTRACT

A computer program product is provided as a session search system and associated method that provide a novel type of query referred to as "session query". In the context of a session query, a user issues a search query using, for example, a web-based form. This query is processed immediately by the search engine, yielding search result elements that are returned within the new context of a "dynamic search result set". As long as the user is reviewing the "dynamic search result set" of the session query, the search result is updated automatically in almost real-time, when new information arrives. When the user is no longer interested in continuing the search, the session query is terminated. The session search system generally includes two modules: A client module that presents the "dynamic search result set" to the user, and a server module that manages the current set of active session queries. The client module implements an executable code in the user's web browser.

29 Claims, 4 Drawing Sheets

SYSTEM AND METHOD FOR PROVIDING A SESSION QUERY WITHIN THE CONTEXT OF A DYNAMIC SEARCH RESULT SET

CROSS-REFERENCE TO RELATED APPLICATIONS

This application relates to patent application Ser. No. 09/544,396, titled "System and Method for Providing GUI Representation of Dynamic Data Set", and filed on even date herewith.

FIELD OF THE INVENTION

The present invention relates to the field of data searching, and particularly to a software system and associated method for use with a search engine, to search data maintained in systems that are linked together over an associated network such as the Internet or Intranet. More specifically, the invention relates to a graphical user interface (GUI) adapted to represent dynamic data sets in various applications and tables, and to query dynamic and large data repositories and indices of Internet search engine providers.

BACKGROUND OF THE INVENTION

The World Wide Web (WWW) is comprised of an expansive network of interconnected computers upon which businesses, governments, groups, and individuals throughout the world maintain inter-linked computer files known as web pages. Users navigate these pages by means of computer software programs commonly known as Internet browsers. Due to the vast number of WWW sites, many web pages have a redundancy of information or share a strong likeness in either function or title. The vastness of the unstructured WWW causes users to rely primarily on Internet search engines to retrieve information or to locate businesses. These search engines use various means to determine the relevance of a user-defined search to the information retrieved.

The authors of web pages provide information known as metadata, within the body of the hypertext markup language (HTML) document that defines the web pages. A computer software product known as a web crawler, systematically accesses web pages by sequentially following hypertext links from page to page. The crawler indexes the pages for use by the search engines using information about a web page as provided by its address or Universal Resource Locator (URL), metadata, and other criteria found within the page. The crawler is run periodically to update previously stored data and to append information about newly created web pages. The information compiled by the crawler is stored in a metadata repository or database. The search engines search this repository to identify matches for the user-defined search rather than attempt to find matches in real time.

A typical search engine has an interface with a search window where the user enters an alphanumeric search expression or keywords. The search engine sifts through available web sites for the user's search terms, and returns the search of results in the form of HTML pages. Each search result includes a list of individual entries that have been identified by the search engine as satisfying the user's search expression. Each entry or "hit" includes a hyperlink that points to a Uniform Resource Locator (URL) location or web page.

In addition to the hyperlink, certain search result pages include a short summary or abstract that describes the content of the URL location. Typically, search engines generate this abstract from the file at the URL, and only provide acceptable results for URLs that point to HTML format documents. For URLs that point to HTML documents or web pages, a typical abstract includes a combination of values selected from HTML tags. These values may include a text from the web page's "title" tag, from what are referred to as "annotations" or "meta tag values" such as "description," "keywords," etc., from "heading" tag values (e.g., H1, H2 tags), or from some combination of the content of these tags.

Typically, search engine providers resort to two types of queries: ad-hoc queries (also called "instant queries"), and persistent queries. Within the context of an ad-hoc query, a user issues a search query using a web based search form. The search query is passed to the search engine for immediate processing of the query and for returning a list of matches (or search result set). Essentially, the ad-hoc queries have a very short execution time, typically on the order of a fraction of a second, depending on the workload of the search engine. The search engine processes this type of queries immediately, searching an indexed repository (or data store). On occasions, a user might seek a particular piece of information, which is not available in the indexed repository at the time the ad-hoc search is conducted. Consequently, the search result set will not contain the desired piece of information.

The persistent type queries offer the users the possibility of a continuous search (wherefrom the term persistent queries) over a long period of time, for example two weeks. During the time span of the persistent query the user receives notification, such collect new data from the Internet, for instance every second, and that continuously update the indexed repository using crawling and gathering technologies. Exemplary popular subscription or persistent query-type services are jCentral's® notification service, and Yahoo!'s® Auction notification.

However, because typical search engine repositories are very dynamic, a desired piece of information might not be indexed at the time the user performs the ad-hoc query. Even if the user issues a persistent query, as described earlier, this query-type normally takes a long time to process, and the user might not receive the desired result for at least one day. The reason for such a delay is that essentially for every incoming piece of information a matching based on search profiles has to be processed, which requires extensive computational resources. For example, considering a search engine that receives 10,000,000 pieces of new information daily, with a set of 1,000,000 persistent queries. Typically, an off-line batch processing task could take several hours to perform the profile matching, at which time the users are notified of a matching query result.

It is therefore clear that the persistent queries do not satisfy the shortcoming of the ad-hoc queries, as the persistent queries are typically processed only on a daily or weekly interval, which does not provide the users with instantaneous information. Yet another problem associated with persistent queries is that users typically forget to, or do not spend the effort to unsubscribe from the persistent queries they issued. Consequently, of the 1,000,000 persistent queries considered in the example above, only a small percentage is useful to process at all. The majority of the stored persistent queries might become obsolete after a certain period of time from the issuance of the queries, because users may have lost interest in the desired information.

There is currently no search mechanism that combines the convenience and speed of ad-hoc-type queries with the notification feature of persistent-type queries. The need for such a search mechanism has heretofore remained unsatisfied.

SUMMARY OF THE INVENTION

The session search system and associated method of the present invention satisfy this need by providing a novel type of query referred to herein as "session query". In the context of a session query, a user issues a search query using, for example, a web-based form. This query is processed immediately by the search engine, yielding search result elements that are returned within the new context of a "dynamic search result set". In other terms, the search result set of the session query session is not static.

One significant difference between the ad-hoc query and the session query is that as long as the user is reviewing the "dynamic search result set" of the session query, the search result is updated automatically in almost real-time, when new information arrives. When the user is no longer interested in continuing the search, such as when the user terminates the search result review process, the life span of the session query terminates. As a result, the session query spans from the initiation of the initial search until either a time-out occurs, for example 20 minutes of inactivity, or when the user expressly terminates the session query by closing the browser window.

The session search system of the present invention generally includes two modules: A client module, also referred to herein as a session manager, that presents the "dynamic search result set", and a server module, also referred to herein as dynamic query matcher, that manages the current set of active session queries. The client module implements an executable code such, as a Java applet, in the user's web browser, or, alternatively, as a stand-alone application.

During the search session, the client module and the server module exchange "alive" messages for ensuring that the session query has not timed out or has not been terminated. In one embodiment the client module sends "alive" messages to the server module, advising the server module that the session is still active. In another embodiment the server module sends "alive" messages to the client module inquiring if the client is still interested in maintaining the session active.

The server module maintains a record of all the current session queries. If new pieces of information arrive from a web crawler or gatherer, the new information is matched with the current set of session queries. Matched items will be sent to the client module, which, in turn, automatically updates the user's graphical user interface that presents the dynamic search result set, e.g. the view screen web browser application.

The session search system and associated method of the present invention provide numerous advantages and benefits to the users and to the search engine providers. For example, the session search system and method enable the users to easily and conveniently perform a search query similar to the ad-hoc query, without the need to subscribe or setup and manage a persistent query. The management of persistent queries can be burdensome to a user, especially when notification, of useless information is sent periodically, for instance every day, via e-mail.

The session query is performed automatically, without special user intervention. The life span of a session query could range, for example, from a few minutes to several hours, varying with the user's needs. The likelihood that a desired piece of information is found during the search query depends on the update frequency of the search engine repository. This improves the overall quality of the search result set, particularly when the search is conducted on very large and dynamic repositories.

The session search system and associated method of the present invention enable the search engine providers to offer a more pro-active interface with the users. In addition, search accuracy will be greatly improved with the increased probability of obtaining a desired piece of information (i.e., a perfect hit), that would have otherwise not been made available at the time a conventional search query was performed.

Moreover, the session search system and associated method of the present invention enable the automatic delivery of the updated information obtained subsequent to the formation and submission of the initial session query, directly into the user's displayed "dynamic search result set". Another feature of the session search system and method is that the updated information is integrated with the users' view screen seamlessly, and almost transparently to the users, to avoid fatigue or distraction.

In addition, the session search system and method will significantly reduce the burden of maintaining and tracking persistent queries. Rather than being concerned about maintaining a large set of persistent queries, the users would rely on the self-maintaining feature of the session query. The session queries will result in a smaller matching process, thus requiring less computing resources, increasing the overall speed of the search process, and ultimately enabling the search engine providers to better allocate their resources.

BRIEF DESCRIPTION OF THE DRAWINGS

The various features of the present invention and the manner of attaining them will be described in greater detail with reference to the following description, claims, and drawings, wherein reference numerals are reused, where appropriate, to indicate a correspondence between the referenced items, and wherein:

DETAILED DESCRIPTION OF THE INVENTION

Figure 1:
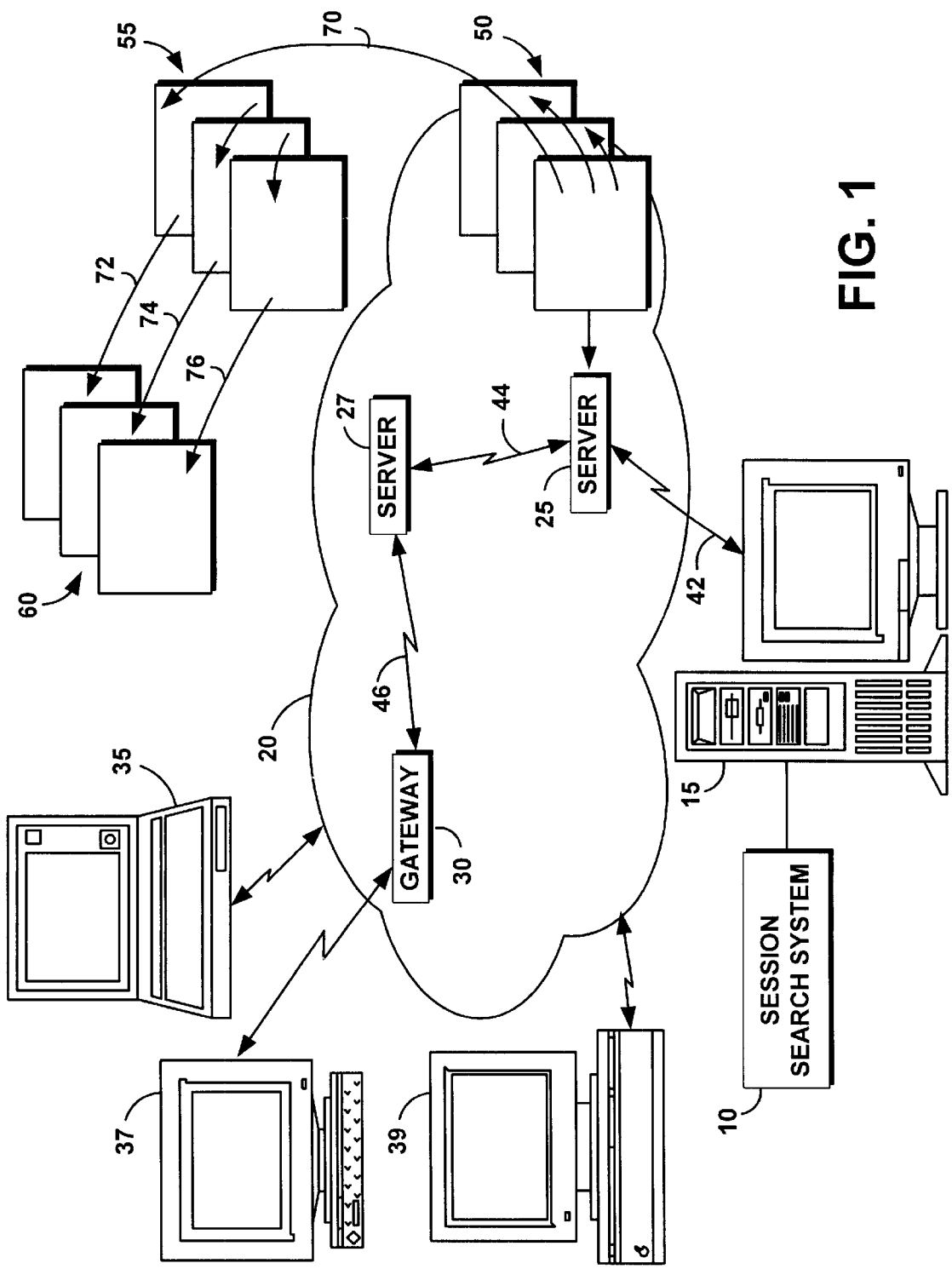
FIG. 1 is a schematic illustration of an exemplary operating environment in which a session search system and associated method of the present invention can be used.

The following definitions and explanations provide background information pertaining to the technical field of the present invention, and are intended to facilitate the understanding of the present invention without limiting its scope:

Crawler

A program that automatically explores the World Wide Web by retrieving a document and recursively retrieving some or all the documents that are linked to it.

HTML (Hypertext Markup Language)

A standard language for attaching presentation and linking attributes to informational content within documents. During a document authoring stage, HTML "tags" are embedded within the informational content of the document. When the web document (or "HTML document") is subsequently transmitted by a web server to a web browser, the tags are interpreted by the browser and used to parse and display the document. In addition to specifying how the web browser is to display the document, HTML tags can be used to create hyperlinks to other web documents.

Internet

A collection of interconnected public and private computer networks that are linked together with routers by a set of standards protocols to form a global, distributed network.

Search Engine

A remotely accessible World Wide Web tool that allows users to conduct keyword searches for information on the Internet.

Server

A software program or a computer that responds to requests from a web browser by returning ("serving") web documents.

URL (Uniform Resource Locator)

A unique address that fully specifies the location of a content object on the Internet. The general format of a URL is protocol://server-address/path/filename.

Web Browser

A software program that allows users to request and read hypertext documents. The browser gives some means of viewing the contents of web documents and of navigating from one document to another.

Web document or Page

A collection of data available on the World Wide Web and identified by a URL. In the simplest, most common case, a web page is a file written in HTML and stored on a web server. It is possible for the server to generate pages dynamically in response to a request from the user. A web page can be in any format that the browser or a helper application can display. The format is transmitted as part of the headers of the response as a MIME type, e.g. "text/html", "image/gif". An HTML web page will typically refer to other web pages and Internet resources by including hypertext links.

Web Site

A database or other collection of inter-linked hypertext documents ("web documents" or "web pages") and associated data entities, which is accessible via a computer network, and which forms part of a larger, distributed informational system such as the WWW. In general, a web site corresponds to a particular Internet domain name, and includes the content of a particular organization. Other types of web sites may include, for example, a hypertext database of a corporate "intranet" (i.e., an internal network which uses standard Internet protocols), or a site of a hypertext system that uses document retrieval protocols other than those of the WWW.

World Wide Web (WWW)

An Internet client—server hypertext distributed information retrieval system.

FIG. 1 portrays the overall environment in which a session search system 10 according to the present invention may be used. The system 10 includes a software or computer program product which is typically embedded within, or installed on a host server 15. Alternatively, the system 10 can be saved on a suitable storage medium such as a diskette, a CD, a hard drive, or like devices. While the system 10 will be described in connection with the WWW, the system 10 can be used with a stand-alone database of terms that may have been derived from the WWW and/or other sources.

The cloud-like communication network 20 is comprised of communication lines and switches connecting servers such as servers 25, 27, to gateways such as gateway 30. The servers 25, 27 and the gateway 30 provide the communication access to the WWW Internet. Users, such as remote Internet users are represented by a variety of computers such as computers 35, 37, 39, and can query the host server 15 for the desired information.

The host server 15 is connected to the network 20 via a communications link such as a telephone, cable, or satellite link. The servers 25, 27 can be connected via high speed Internet network lines 44, 46 to other, computers and gateways. The servers 25, 27 provide access to stored information such as hypertext or web documents indicated generally at 50, 55, 60. The hypertext documents 50, 55, 60 most likely include embedded hypertext link to other locally stored pages, and hypertext links 70, 72, 74, 76 to other webs sites or documents 55, 60 that are stored by various web servers such as the server 27.

Figure 2:
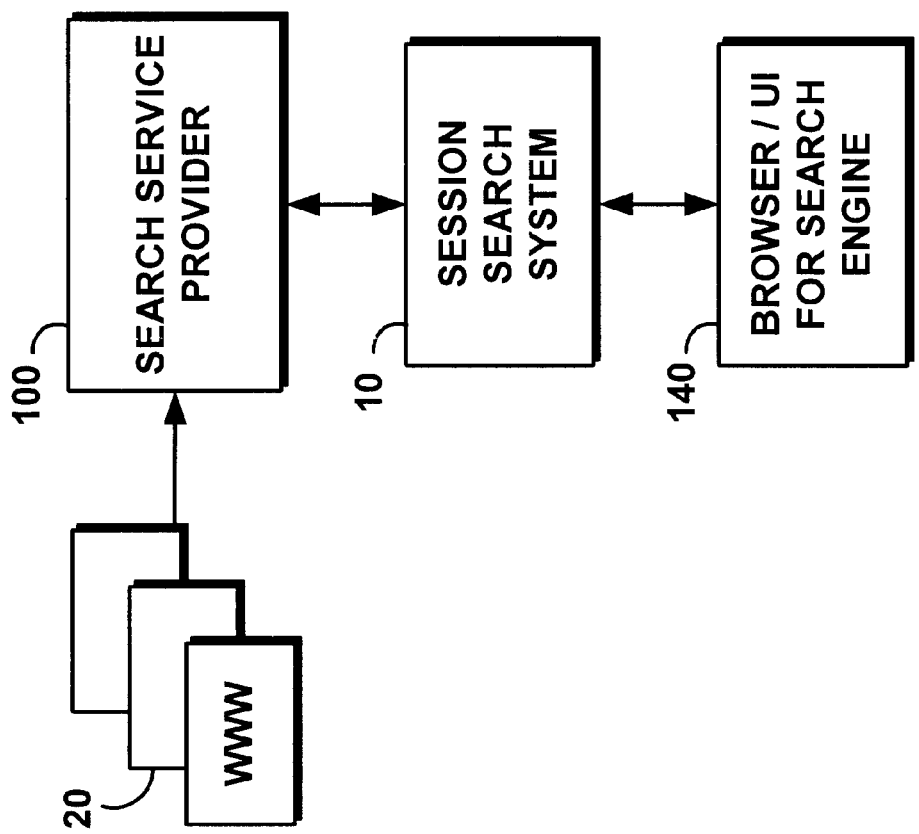
FIGS. 2 and 3 are block diagrams that illustrate a high level architecture of the session search system of FIG. 1 shown used in the context of an Internet search.

FIG. 2 illustrates a high level architecture showing the session search system 10 used in the context of an Internet search. The session search system 10, transparently to the user, continuously or periodically operates in the background, as an interface between a user's browser or a user interface (UI) and a search service provider 100, as it will be explained later in greater detail. While the search service provider 100 and the session search system 10 are described and illustrated herein as being separate, it should be clear that these two components can be functionally combined as part of the search service provider 100.

Figure 3:
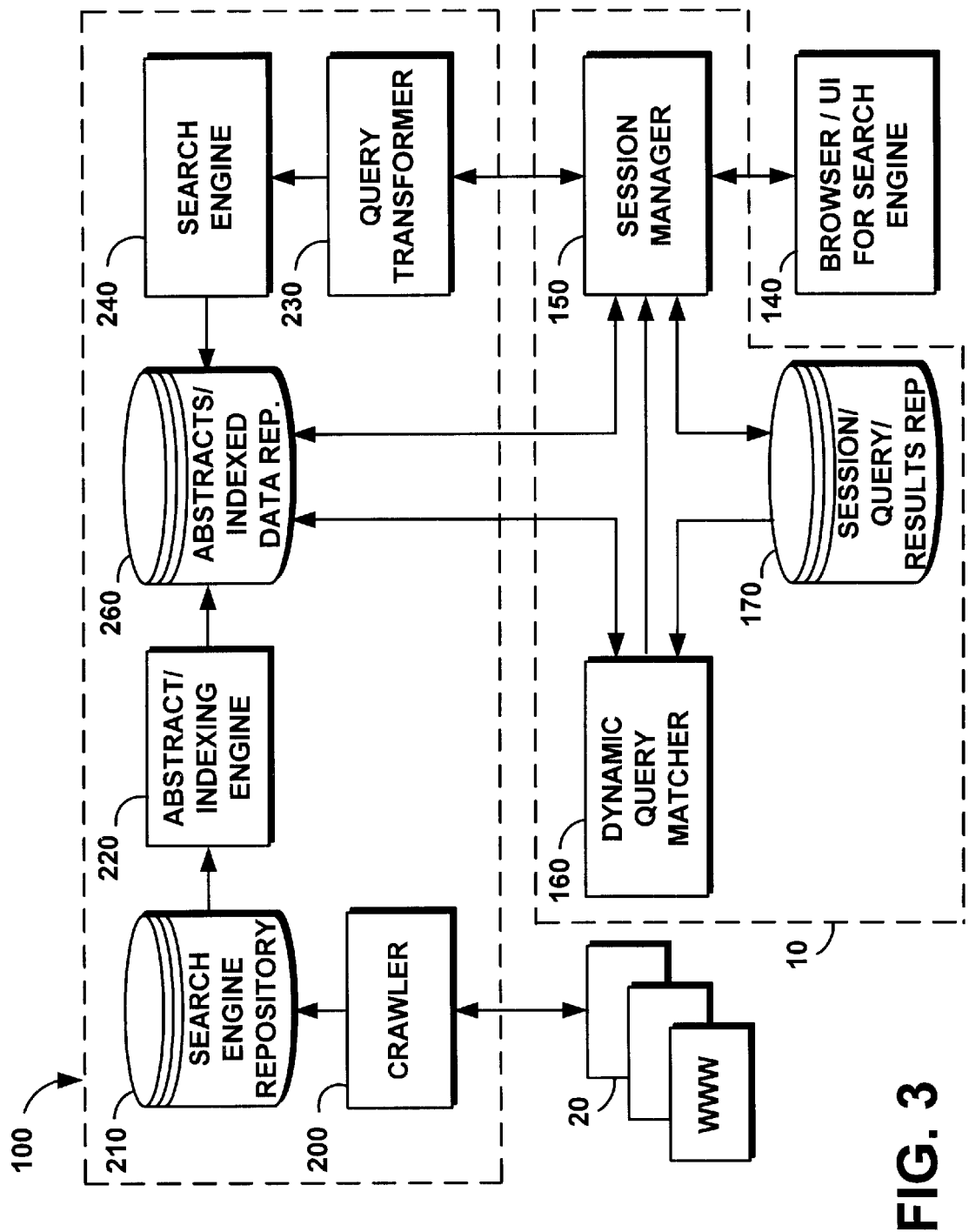

With further reference to FIG. 3, the session search system 10 includes the following components: a user module also referred to herein as a session manager 150, a server module also referred to herein as dynamic query matcher 160, and a session/query/results repository 170.

The session manager 150 is responsible for identifying and tracking active user sessions, that is if the session is still active. When a user performs the initial query the session manager 150 determine if the session query is still active. If the session query has lapsed or has been terminated, the session manager 150 automatically removes this session query from the active session list.

The client session query is then forwarded to the search service provider 100 for normal query processing, whereupon the search service provider 100 forwards the search results to the session search system 10 for further processing. The query and query results are stored in the session/query/results repository 170 for later use by the dynamic query matcher 160.

The dynamic query matcher 160 periodically checks for open sessions that have not been updated recently. This time threshold is completely configurable by the session search system 10. Queries for open sessions are resubmitted to the search service provider 100. Such queries will be referred to herein as "session queries" to distinguish them over the "initial query" that was originally submitted by the user.

The search service provider 100 returns search results based on the session queries to the session search system 10. Such search results will be referred to herein as "session search results" to distinguish them over the "search results" generated by the search service provider 100 based on the user's initial query. The session search results are stored in the session/query/results repository 170, and compared to the most recent search results or session search results previously submitted to the user. In one embodiment, the most recent session search results replace or complement the search results or session search results previously submitted to the user.

In a preferred embodiment, changes between the most recent session search results and the previous search results (or the previous session search results), are forwarded to the session manager 150 in the form of "inserts", "updates", or "deletions". In turn, the session manager 150 forwards these changes to the session manager 150. The session manager 150 can be implemented as a Java applet running on the user's web browser or as an executable client application, by inserting, updating, and/or deleting changed entries to the previous search results.

The session/query/results repository 170 stores the following information: the session ID, the user's initial query, the query search results, and the session query search results.

As an example, a user uses the browser or user interface (UI) 140 to enter a search query which is transmitted to the search service provider 100. In turn, the search service provider 100, having already accessed the WWW 20, searches the metadata stored in the local query database, and submits the search result set to the user. The search result set includes a list of URLs associated with brief abstracts describing the nature of the resources found, and the relevant annotations.

The search service provider 100 is generally comprised of a web crawler 200, a search engine repository 210, an abstract/indexing engine 220, a query transformer 230, a search engine 240, and an abstracts/indexed data repository 260. Optionally, the search service provider 100 includes a search results transformer (not shown). Alternatively, the search results transformer can be combined with the session manager 150 of the session search system 10.

In use, the crawler 150 crawls the WWW 20 and downloads web documents to the search engine repository 210 where they are stored and updated systematically. The abstract/indexing engine 220 indexes the web documents and generates abstracts therefrom. The abstracts and the indexed data are stored in the abstracts/indexed data repository 260 for later use by the search engine 240, as appropriate.

The search engine repository 210 is a data store which is maintained by a web information gatherer such as the web crawler 200. The search engine repository 210 maintains information or metadata from previously encountered web pages, which metadata is used by the abstract/indexing engine 220 to prepare the abstracts. Preferably, the search engine repository 210 is maintained centrally by the search service provider 100. Alternatively, the search engine repository 210 may be located and maintained on an independently provided system to which the search service provider 100 has access. In addition, while the system 10 is described as including two repositories 210 and 260, it should be clear these two repositories 210 and 260 could be functionally combined in a single database.

The abstract/indexing engine 220 generates an abstract for each web document from the metadata stored in the search engine repository 210. While the abstract/indexing engine 220 is illustrated in FIG. 3 as being a single component, it should be clear that the abstract/indexing engine 220 could be functionally separated into two distinct engines: an abstract engine and an indexing engine.

The query transformer 230, prompted by the user browser 140, applies an internal query request to the abstracts/indexed data stored in the abstracts/indexed data repository 260, and generates a search result with matches (or search results) that are specific to the user's query. As it has been explained earlier, so long as the user has not terminated the search session, the user's initial query is resubmitted to the search engine 240 for update.

The search results 270 are transformed into viewable or browsable form (i.e., HTML) by the query transformer 230, and the transformed data is subsequently presented to the user at the user interface (UI) or browser 140.

A specific example will assist in clarifying the operating of the session search system 10. Consider for example, a software developer who is seeking a particular implementation of a heap or quick sort algorithm. This user performs a session query using the search service provider's (100) basic search web interface. The search service provider 100 returns 27 search result items, embedded in the context of the "dynamic search result set". While the user is browsing through the search result set, new resources are continuously added to the search service provider's (100) repository 260, and instantaneously matched with the session query of the user. If matches exist, the "dynamic search result set" is updated automatically by the session search system 10, and new results are flagged to the user.

During the session query, the user visits other web sites, and returns to the "dynamic search result set" within, for example, twenty minutes. Meanwhile, the requested piece of information has arrived and the user's graphical user interface is updated. When the user terminates the session query, or when the session query times out, the session search system 10 recognizes this command and stops the session query resubmission process.

Figure 4:
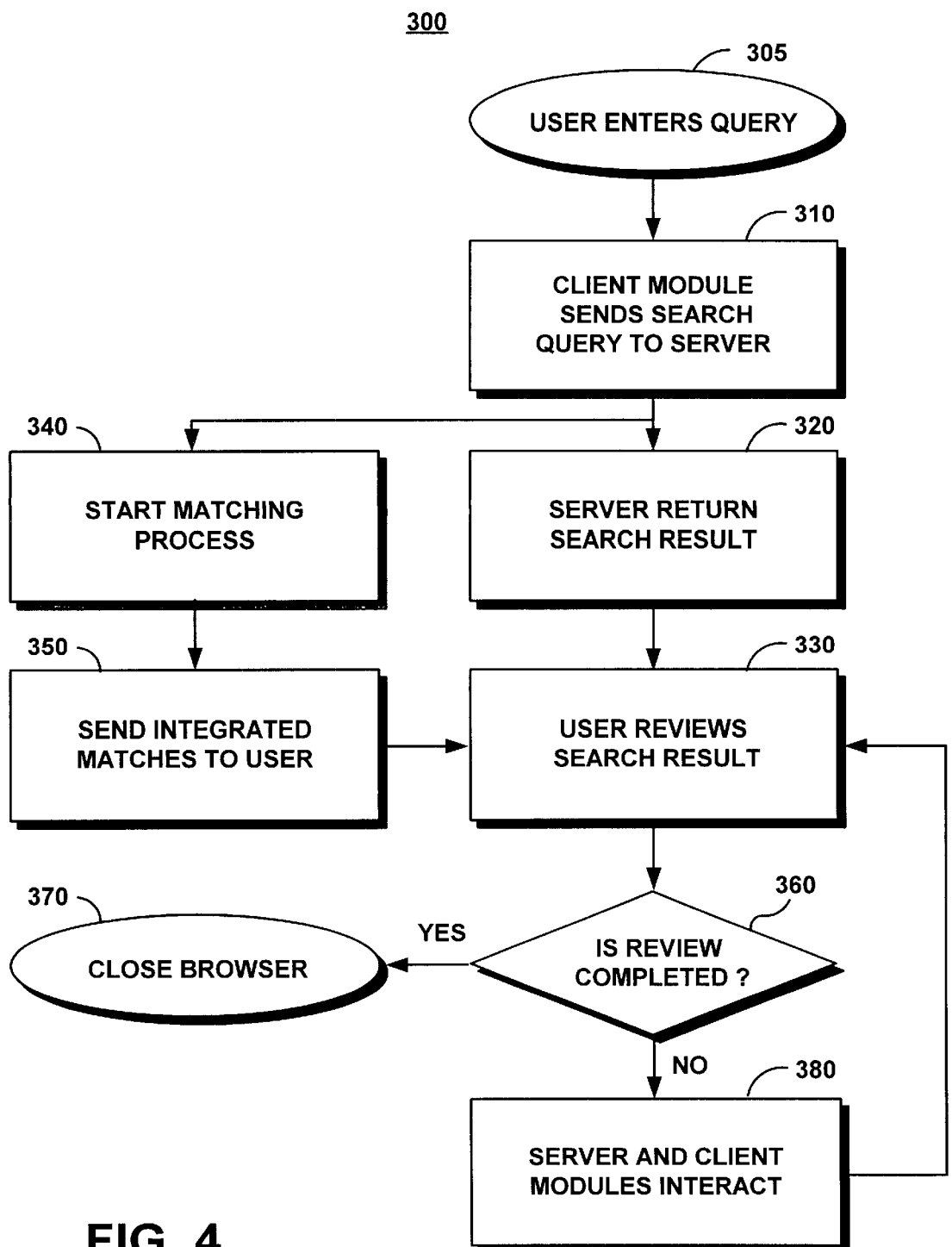
FIG. 4 is a flow chart that depicts the operation of the session search system of FIGS. 1–3.

The method of operation 300 of the session search system 10 will now be briefly summarized in connection with FIG. 4. At step 305 of the method 300, the user enters a query using the browser 140. At step 310, the session manager (otherwise referred to as client module) 150 sends the search query to the search service provider (also referred to herein as server) 100.

Whereupon, at step the search service provider 100 returns the search results to the user's web browser 140, and establishes a connection with the session manager 150 for opening a session query. The user reviews the search results at step 330.

Simultaneously with step 320, the method 300 starts the matching process at step 340. This matching step results in new matched items that are integrated with the previous search results that are displayed to the user.

At step 360 the method 300 inquires if the user has completed the review of the search result. If so, the method 300 closes the browser 140 at step 370. If not, the client module (session manager) 150 and the server module (dynamic query matcher) 160 exchange "alive" messages, as explained above. The cycle of reviewing the search results at step 330, inquiring if the review process is completed at step 360, and interaction between the server and clients modules at step 380 is repeated until the review process is completed at step 370.

It is to be understood that the specific embodiments of the invention that have been described are merely illustrative of certain application of the principle of the present invention. Numerous modifications may be made to the abstract update system and associated method described herein without departing from the spirit and scope of the present invention. Moreover, while the present invention is described for illustration purpose only in relation to the WWW, it should be clear that the invention is applicable as well to databases and other tables with indexed entries.

What is claimed is:

1. A session search system for use with a search engine to query a dynamic data repository of the search engine when prompted by a session query from a user, comprising:

a client module for presenting a dynamic search result set to the user;

a server module for managing a plurality of active session queries;

wherein as long as a search query is active, the client module updates the search result set automatically and immediately when new data become available; and wherein when the search query is no longer active, the server module terminates the session query.

2. The session search system according to claim 1, wherein the user enters the session query by means of a user interface; and wherein the client module implements an executable program in the user interface.

3. The session search system according to claim 2, wherein the client module executes a Java applet application.

4. The session search system according to claim 2, wherein during the search session the client module and the server module exchange "alive" messages to determine if the session query is still active.

5. The session search system according to claim 4, wherein when new data are acquired by the search engine, the client module matches the new data with the active session query resulting in an updated search result set; and wherein the client server automatically updates the user interface.

6. The session search system according to claim 5, further including a session/query/results repository for storing an updated search result set in response to the same session query.

7. The session search system according to claim 2, wherein the server module periodically checks for query sessions that have not been updated within a predetermined period of time.

8. The session search system according to claim 5, wherein the client server compares a most recent search result set that was sent to the user interface and the updated search result set.

9. The session search system according to claim 8, wherein the client server replaces the most recent search result set with the updated search result set.

10. The session search system according to claim 8, wherein the updated search result set includes a change comprised of any one or more of: an insert, an update, or a deletion, over the most recent search result set.

11. A computer program product for use with a search engine to query a dynamic data repository of the search engine when prompted by a session query from a user, comprising:

a client module for presenting a dynamic search result set to the user;

a server module for managing a plurality of active session queries;

wherein as long as a search query is active, the client module updates the search result set automatically and immediately when new data become available; and wherein when the search query is no longer active, the server module terminates the session query.

12. The computer program product according to claim 11, wherein the user enters the session query by means of a user interface; and wherein the client module implements an executable program in the user interface.

13. The computer program product according to claim 12, wherein the client module executes a Java applet application.

14. The computer program product according to claim 12, wherein during the search session the client module and the server module exchange "alive" messages to determine if the session query is still active.

15. The computer program product according to claim 14, wherein when new data are acquired by the search engine, the client module matches the new data with the active session query resulting in an updated search result set; and wherein the client server automatically updates the user interface.

16. The computer program product according to claim 15, further including a session/query/results repository for storing an updated search result set in response to the same session query.

17. The computer program product according to claim 12, wherein the server module periodically checks for query sessions that have not been updated within a predetermined period of time.

18. The computer program product according to claim 15, wherein the client server compares a most recent search result set that was sent to the user interface and the updated search result set.

19. The computer program product according to claim 18, wherein the client server replaces the most recent search result set with the updated search result set.

20. The computer program product according to claim 18, wherein the updated search result set includes a change comprised of any one or more of: an insert, an update, or a deletion, over the most recent search result set.

21. A method for querying a dynamic data repository of the search engine when prompted by a session query from a user, comprising:

presenting a dynamic search result set to the user;

managing a plurality of active session queries;

wherein as long as a search query is active, updating the search result set automatically and immediately when new data become available; and wherein when the search query is no longer active, terminating the session query.

22. The method according to claim 21, further including entering the session query by means of a user interface; and implementing an executable program in the user interface.

23. The method according to claim 22, wherein implementing the executable program includes executing a Java applet application.

24. The method according to claim 22, further including exchanging "alive" messages to determine if the session query is still active.

25. The method according to claim 24, wherein when new data are acquired, matching the new data with the active session query resulting in an updated search result set; and automatically updating the user interface.

26. The method according to claim 25, further storing an updated search result set in response to the same session query.

27. The method according to claim 22, wherein exchanging "alive" messages to determine if the session query is still active includes periodically checking for query sessions that have not been updated within a predetermined period of time.

28. The method according to claim 25, further including comparing a most recent search result set that was sent to the user interface and the updated search result set.

29. The method according to claim 28, further including replacing the most recent search result set with the updated search result set.

* * * * *